Figure 1A:
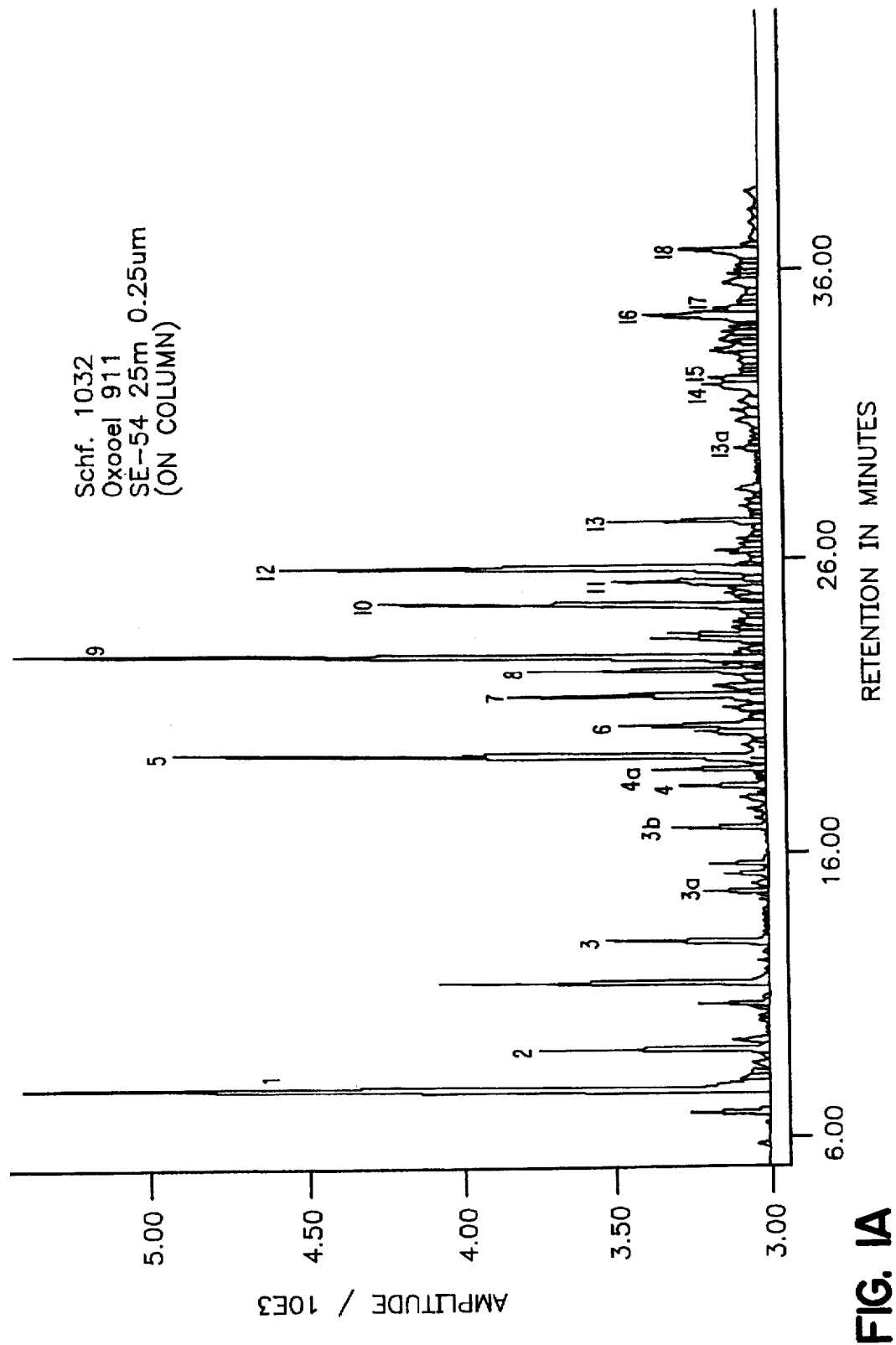

United States Patent [19]

Meixner et al.

[11] Patent Number: 5,702,517
[45] Date of Patent: Dec. 30, 1997

[54] ADDITIVES FOR PLASTICS, IN PARTICULAR FOR PVC

[75] Inventors: Hubert Meixner, Ludwigshafen; Wolfgang Reuther, Heidelberg; Volker Königstein, Maxdorf, all of Germany

[73] Assignee: BASF Aktiengesellschaft, Ludwigshafen, Germany

[21] Appl. No.: 576,227

[22] Filed: Dec. 21, 1995

[30] Foreign Application Priority Data

Dec. 22, 1994 [DE] Germany .................... 44 46 059.7

[51] Int. Cl.⁶ .................................... C08H 5/00
[52] U.S. Cl. .................................... 106/316; 524/414
[58] Field of Search .................... 106/316; 524/414

[56] References Cited

U.S. PATENT DOCUMENTS 3,454,514  7/1969  Baum ......................... 524/396
4,371,654  2/1983  Spielau et al. ............... 524/296

FOREIGN PATENT DOCUMENTS 184 382   6/1986   European Pat. Off. .
398 100   5/1990   European Pat. Off. .
30 21 112 12/1981  Germany .
30 22 468 12/1981  Germany .

OTHER PUBLICATIONS

Derwent abstract AN 81–95146D of DE 3021112, Nov. 1990.

Primary Examiner—Mark L. Bell
Assistant Examiner—Scott L. Hertzog
Attorney, Agent, or Firm—Keil & Weinkauf

[57] ABSTRACT

Oxo oils may be used as additives for plastics, in particular for a chloride-containing plastic, preferably PVC, as part of liquid stabilizer compositions.

26 Claims, 3 Drawing Sheets

STRUCTURES a-I (WITH C-9 BUILDING BLOCKS)     MW

270

300

284

426

410

174

270

270

286

ADDITIVES FOR PLASTICS, IN PARTICULAR FOR PVC

The present invention relates to a novel use of oxo oils. In particular, the present invention relates to additives for plastics, especially PVC. Finally, the present invention relates to an additive for plastics such as PVC or other halogen-containing plastics.

The stabilization of plastics, in particular halogen-containing thermoplastics, for example chlorine-containing thermoplastics and in particular polyvinyl chloride (PVC), is a broad and important area of chemical research and development. Many additives for plastics having different directions of action have been developed. Plasticizers, antioxidants and flame-retardant agents are some examples of additives.

Plastics and in particular PVC are now frequently processed by the addition of liquid stabilizers to give products which are then further processed to films, injection moldings and the like, without these materials significantly deteriorating during processing with regard to their appearance and/or with regard to the properties of the end products.

In the stabilization of plastics, one or more of the following problems or disadvantages frequently occur:

Components of the stabilizer formulations, in particular solvents and plasticizers, emerge from the surface of the plastics material, ie. exudation.

Greasy films form on the surface of the plastics, in particular on the surface of finished PVC products.

It is more difficult to print on the plastics surfaces.

Imprinted characters diffuse out.

Imprinted characters become blurred.

The adhesive bonding properties of calendered films are poor.

Calendered products are difficult to weld, in particular after a relatively long storage time.

Additives having flashpoints below a relatively low value, in Germany typically having a flashpoint below 56° C., must comply with labelling requirements, with the result that low-boiling solvents in stabilizer compositions lead to poorer acceptance.

It is an object of the present invention to provide stabilizer additives for plastics, which additives either do not have one or more of the abovementioned disadvantages at all or have them only to a small extent. In particular, it is an object of the present invention to provide a stabilizer composition which is solvent-free but nevertheless can be processed as a liquid stabilizer.

We have found that this object is achieved, according to the invention, by a stabilizer composition or an additive for plastics which comprises a significant proportion of oxo oil. Preferably, the novel additive contains 5–70 parts by weight of oxo oil, 1–30 parts by weight of alkali metal and/or alkaline earth metal salts and salts of zinc and/or cadmium or aluminum with organic acids of 8 to 18 carbon atoms, 0.5–5 parts by weight of antioxidants, 5–30 parts by weight of plasticizers and 5–50 parts by weight of organic phosphite. Further preferred compositions comprising the novel additives or the novel stabilizer compositions are defined in the claims and in the Examples below.

It is known that oxo oils can be used as intermediates in the preparation of fuel additives. EP 398 100 describes the alkoxylation of oxo oils and the addition of these products to, in particular, fuels for gasoline engines. The stated European Patent reports that deposition in the intake valves is considerably reduced by this gasoline additive.

Since the oxo oils are residues from the preparation of, for example, oxo alcohols of more than 8 carbon atoms and are therefore obtained in relatively large amounts, it is a further object of the invention to find a further use for such oxo oils. We have found that this further object of the invention is achieved by the use of the oxo oils or the oxo oil fractions as additives for plastics.

In particular, we have found that the oxo oils can be used in an advantageous manner as part of liquid stabilizers for plastics, in particular halogen-containing plastics, chloride-containing plastics and especially PVC.

We have found that, when the oxo oils are used, a large number of very positive results are achievable. These are in particular the following:

Plate-out is avoided or reduced.

The expansion behavior of chemically foamed plastics, in particular chemically foamed PVC, is positively influenced; the pore size of the foams and the processibility are positively influenced.

The transparency of the relevant plastics compositions, in particular of calendered PVC products, is substantially improved.

Exudation of the oxo oils or other stabilizer components which are incorporated together with this oxo oil into the plastic was not observed in a test in a damp heat atmosphere (7 days at 40° C., 14 days at 40° C., in each case at 100% atmospheric humidity).

Flashpoint problems on dilution of concentrated liquid stabilizers with solvents, as were observed with various gasoline fractions, do not occur in the case of the oxo oils.

The storability of the liquid stabilizers diluted with oxo oils is substantially improved compared with the products diluted with gasoline fractions.

The use of the plastics compositions which contain oxo oils has no adverse effects in special applications in the automotive sector, in particular in low-fogging applications.

Flocculation of components of the formulation, haze and miscibility gaps occur to a lesser extent, if at all.

Combustion takes place to give $CO_2$ and water and leaves no residue.

The oxo oils which may be used according to the invention have one or more of the following characteristics:

a. They consist essentially of a mixture of low boilers and high boilers, ie.

| Substance | Structure | Substituent R, R', R" = Alkyl | Amount |
|---|---|---|---|
| Alcohols | $R-CH_2-OH$ | $R = C_3-C_{19}$ | 5–20 |
| 2-Alkylalcohols by aldolization | $R-CH-CH_2-OH$<br>$\|$<br>$R'$ | $R = R' =$<br>$C_2-C_{18}$ | 20–45 |

-continued

| Substance | Structure | Substituent R, R', R" = Alkyl | Amount |
|---|---|---|---|
| Ether alcohols | R—CH$_2$—CH—O—CH$_2$—R'<br>                \|<br>                CH$_2$OH | R = C$_2$–C$_{18}$<br>R' = C$_3$–C$_{19}$ | 5–15 |
| Esters from Cannizzaro reaction |           O<br>          \|\|<br>R—CH$_2$—C—O—CH$_2$R' | R = C$_2$–C$_{18}$<br>R' = C$_3$–C$_{19}$ | 5–15 |
| Monoesters of the diol |                     O<br>                    \|\|<br>            CH$_2$—O—C—CH$_2$R'<br>            \|<br>R—CH$_2$—CH—CH<br>             \|<br>             OH      CH$_2$R" | R = C$_2$–C$_{18}$<br>R' = C$_2$–C$_{18}$<br>R" = C$_3$–C$_{19}$ | 10–30 |
| Esters of 2-alkylalcohols | R—CH$_2$—CH—CH$_2$—R'<br>                \|<br>            CH$_2$—O—C—CH$_2$R"<br>                      \|\|<br>                      O | R = R' =<br>R" = C$_2$–C$_{18}$ | 5–15 |

The amounts are parts by weight, preferably percentages by weight. They vary depending on the procedure in the hydroformylation reaction.

b. They consist of alcohols, ether alcohols, esters and diols having molecular weights of 220–500, and, where two O-containing groups are present, the corresponding O atoms are separated from one another by 2 or 3 carbon atoms.

c. They are the residue or a fraction of the residue from the reaction product of the oxo synthesis, in particular of the hydroformylation or oxo reaction of C$_3$–C$_{18}$-alkenes or of C$_6$–C$_{18}$-alkenes, preferably of propylene or butene, in particular n-butene; preferably, these oxo oils are the residue, in particular the distillation residue, from the preparation of oxo alcohols of more than 8 carbon atoms.

d. They consist essentially only of C, O and H; they are in particular halogen-free.

e. They have the following physical properties:

Density (20° C.): 0.82–0.94 g/cm$^3$

Viscosity (20° C.): 20–500 mPa.s

Pour point: <–10° C.

Boiling range: 230°–360° C.

The use of the oxo oils in stabilizers for plastics, in particular in PVC stabilizers, has many advantageous properties which appear to be due to the finely tailored interplay of the large number of oxo oil components with the liquid stabilizer components and the plastics molecules. Adverse effects with regard to ease of incorporation, compatibility and miscibility of stabilizers, in particular of the alkaline earth metal liquid stabilizers and in particular of the Ba, Zn and Ca/Zn liquid stabilizers, and the processibility with PVC and plasticizers have been completely or very substantially avoided.

The Examples which follow illustrate the invention.

EXAMPLE 1

Characterization of C$_9$/C$_{11}$ oxo oil

Figure 1B:
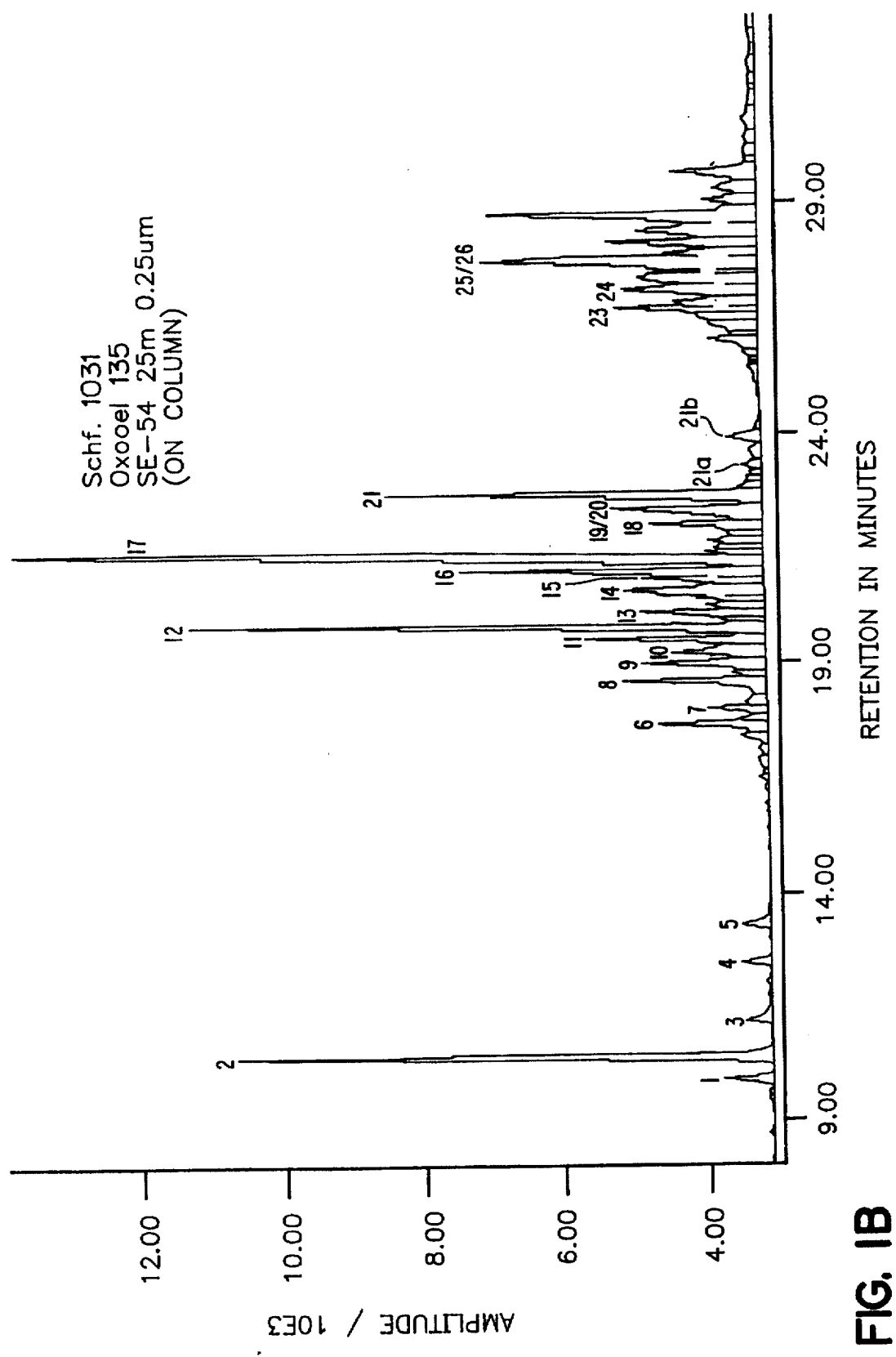
Figure 2A:
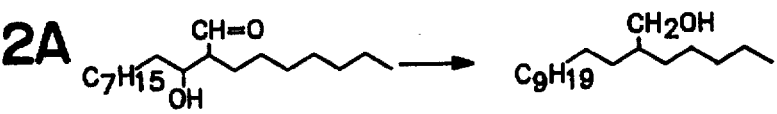
Figure 2B:
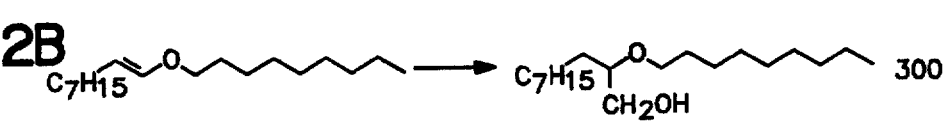
Figure 2C:
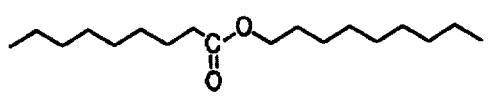
Figure 2D:
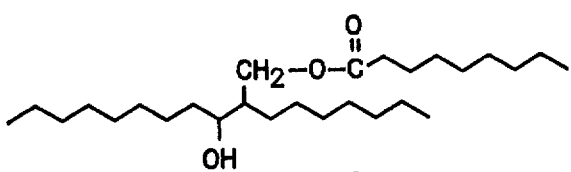
Figure 2E:
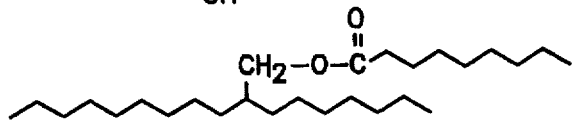
Figure 2F:
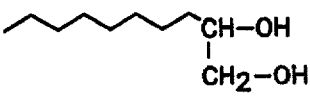
Figure 2G:
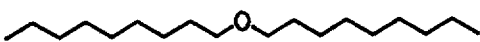
Figure 2H:
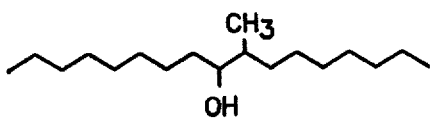
Figure 2I:
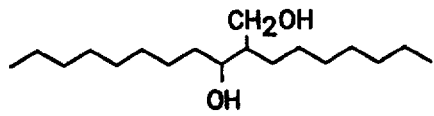

The stated oxo oil, which is also referred to as oxo oil 911, was separated by gas chromatography on a 50 m SE-54 fused silica capillary and investigated by GC/MS. FIG. 1a shows the gas chromatogram for oxo oil 911. FIG. 1b shows a corresponding gas chromatogram for an oxo oil referred to as oxo oil 135.

The main components may be assigned to secondary products of straight-chain oxo products, while the many compounds in lower concentrations are said to have formed from the branched, isomeric intermediates according to the same scheme.

The structures of the main components were derived essentially from the mass spectra.

The identified compound types and the probable method of formation are described below:

Chemical structures in the oxo oil

The compounds a–i, as shown in FIG. 2, were found. In the gas chromatograms of FIGS. 1a and 1b, the peaks are numbered and these numbers relate to the compound numbers below.

Type a

Aldolization of two aldehyde building blocks with elimination of water and hydrogenation to give the branched 2-alkylalcohol (C-9/9; C-9/11 and C-11/11 leads to compounds 5, 9 and 12 in oxo oil 911). (Similarly: n-butyraldehyde to 2-ethylhexanol.) The reaction is shown schematically in FIG. 2.

Type b

Acetalation of the aldehyde with 2 moles of alcohol, elimination of the alcohol radical to give the vinyl ether and subjecting the double bond to an oxo reaction leads to the ether alcohol. The additional carbon atom is probably introduced at the C-1 of the vinyl ether. (C-9/9; C-9/11 and C-11/11 lead to the compounds 7, 10 and 13.) The reaction is shown schematically in FIG. 2.

Type c

Cannizzaro disproportionation of two aldehydes. (C-9/9; C-9/11 and C-11/11 lead to the compounds 4a, 8 and 11.)

Type d

Aldol condensation of two aldehyde building blocks with subsequent Cannizzaro disproportionation leads to monoesterified diol. (Similarly: hexanol from n-butyraldehyde)

| Aldol product | + Aldehyde | = Component | Molecular weight |
|---|---|---|---|
| C-18 (9 + 9) | C-9 | 14 | 426 |
| C-18 | C-11 | 16 | 454 |
| C-20 (9 + 11) | C-9 | 16 | 454 |
| C-20 | C-11 | 18 | 482 |
| C-22 (11 + 11) | C-9 | 18 | 482 |

The combination of the C-22-aldol with the C-11-aldehyde was not found.

Type e

Reaction as type d, with subsequent elimination of water and hydrogenation of the double bond (formally: ester of a).

| Aldol product | + Aldehyde | = Component | Molecular weight |
|---|---|---|---|
| C-18 (9 + 9) | C-9 | 13a | 410 |
| C-18 | C-11 | 15 | 438 |
| C-20 (9 + 11) | C-9 | 15 | 438 |
| C-20 | C-11 | 17 | 466 |
| C-22 (11 + 11) | C-9 | 17 | 466 |
| C-22 | C-11 | No doubt on tailing of 18494 | |

Type f

The components 2 and 3 are 30 mass units greater than the C-9/11-alcohols. These are 1,2- or 1,3-diols, which may be formed by elimination of an olefin from the ether alcohol b. In a low-boiling fraction of the oxo oil from nonanol-N, this compound type, after silylation, was characterized as a diol by GC/MS.

Type g

The components 3b and 6 are dialkyl ethers (C-9/C-9 and C-9/C-11 having molecular weights of 270 and 298). They form, for example, by hydrogenation of the vinyl ethers stated under b.

Type h

The components 3a and 4 having molecular weights of 270 and 298 eliminate water very readily in chemical ionization in the mass spectrometer; they could be secondary alcohols, possibly having structures which form on hydrogenation of the aldehyde group of the aldol a to the methyl group.

Type i

Diol from aldolization with subsequent hydrogenation of the aldehyde group (component 12a).

Comparison of the gas chromatograms of oxo oil 911 and oxo oil 135

The results of the coupled GC/MS investigation for the oxo oil 911, separated on a 50 m SE-54 capillary, are compared with a coupled GC/MS investigation for the oxo oil 135, separated on 35 m SE-54 capillary (MS 93N00614-4493).

(A is the C-9 radical and the C-13 radical and B is the C-11 radical and the C-15 radical in the oxo oils 911 and 913, respectively.)

Peak numbering in the coupled GC/MS investigations for the oxo oils.

| Type | Structure | Peak No. (911) | Molecular weight | Peak No. (135) | Molecular weight |
|---|---|---|---|---|---|
| | B alcohol | 1 | 172 | 1 + 2 | 228 |
| (f) | A diol | 2 | 174 | 3 | 230 |
| (f) | B diol | 3 | 202 | 5 | 258 |
| (h) | Second. alcohol | 3a | 270 | 7 | 382 |
| (g) | A/A ether | 3b | 270 | 8 | 382 |
| (h) | Second. alcohol | 4 | 298 | | |
| (c) | A/A ester | 4a | 284 | 11 | 396 |
| (a) | A/A alcohol from aldolization | 5 | 270 | 12 | 382 |
| (g) | A/B ether | 6 | 298 | 13 | 410 |
| (b) | A/A ether alcohol | 7 | 300 | 14 | 412 |
| (c) | A/B ester | 8 | 312 | 16 | 424 |
| (i) | A/A diol from aldolization | 9 | (286) | 17 | 398 |
| (a) | A/B alcohol from aldolization | 9 | 298 | 17 | 410 |
| (b) | A/B ether alcohol | 10 | 328 | 18 | 440 |
| (c) | B/B ester | 11 | 340 | 20 | 452 |

-continued

| Type | Structure | Peak No. (911) | Molecular weight | Peak No. (135) | Molecular weight |
|---|---|---|---|---|---|
| (i) | A/B diol from aldolization | 12a | (314) | 21 | 426 |
| (a) | B/B alcohol from aldolization | 12 | 326 | 21 | 438 |
| (b) | B/B ether alcohol | 13 | 356 | 21a | 468 |
| (i) | B/B diol from aldolization | — | — | 21b | 454 |
| (e) | Ester of the alcohols from aldolization (A/A/A) | 13a | 410 | 22 | 578 |
| (d) | Monoester of the diol from aldolization (A/A/A) | 14 | 426 | 23 | 594 |
| (e) | Ester of the alcohol from aldolization (A/A/B) + (A/B/A) | 15 | 438 | 24 | 606 |
| (d) | Monoester of the diol from aldolization (A/A/B) + (A/B/A) | 16 | 454 | 25 | 622 |
| (e) | Ester of the alcohol from aldolization (A/B/B) + (B/B/A) | 17 | 466 | 26 | 634 |
| (d) | Monoester of the diol from aldolization (A/B/B) + (B/B/A) | 18 | 482 | — | (650) |
| (e) | Ester of the alcohol from aldolization (B/B/B) | on tailing of 18 | (494) | — | (662) |

The molecular weights which appear in parentheses are only postulated and have not been measured.

The gas chromatographic comparison of the oxo oil 911 with the oxo oil 135 shows strong analogies, so that the structural elucidation of the individual components carried out in great detail on the oxo oil 911 could be applied to the oxo oil 135. This is supported by a coupled GC/MS investigation of the oxo oil 135, even though, in the high-boiler range, the gas chromatographic resolution in the coupled GC/MS investigation decreased to such an extent, probably owing to insufficient heating of connecting lines, that no further MS spectra were obtained.

The main components of the oxo oils were determined by GC/MS and quantified by standardizing the GC/peak areas to 100%. (Quantitative evaluation over 25 m SE-54 capillary with cold-on-column metering in the case of oxo oil 135 and 50 m Ultra-1 capillary in the case of oxo oil 911.)

These are alcohols, ethers and esters from two molecules of the oxo product (and from three building blocks in the case of the high boilers), which may form in secondary reactions of the oxo aldehyde; in some cases, a further carbon atom is incorporated as alcohol (types b and f).

Specifically, structures a–i were found (cf. FIG. 2), which have been formed from the straight-chain components of the oxo product. Since it is to be assumed that the branched isomers of the oxo product behave in a similar manner chemically, the composition of the total mixture can be determined from the concentrations of the main components.

The high boilers and the compounds formed from a single building block, ie. oxo alcohol and type f, are not taken into account in the projection.

| Type | Structure | Contents in % by area | |
|---|---|---|---|
| | | Oxo oil 911 | Oxo oil 135 |
| | Oxo alcohol from synthesis (undecanol and pentadecanol, respectively) | 10,7 | 6,1 |
| a. | 2-Alkylalcohol from aldolization | 29,1 | 27,9 |
| b. | Ether alcohol | 13,3 | 6,7 |
| c. | Ester from Cannizzaro reaction | 8,2 | 11,7 |
| f. | 1,2-Diol | 3,5 | 1,0 |
| g. | Dialkyl ether | 4,1 | 5,4 |
| h. | Secondary alcohol | 2,2 | 4,1 |
| i. | Diol from aldolization | 3,9 | 2,3 |
| | Total high boilers | 24,9 | 34,8 |
| d. | Monoester of the diol from aldolization | about 12,4 | about 17,4 |
| e. | Ester of 2-alkylalcohol from aldolization | about 12,5 | about 17,4 |

Finally, the two oxo oils are also characterized by the amounts of functional groups. The result is as follows:

| Oxo oil 135 | |
|---|---|
| OH number | 117 mg KOH/g |
| Acid number | 1.1 mg KOH/g |
| Carbonyl number | 1 mg KOH/g |
| Ester number | 37 mg KOH/g |
| Zeisel alkoxy distribution: | |
| —$OC_3H_7$ | 1.3 g/100 g |
| —$OC_{12}H_{25}$ | 1.0 g/100 g |
| -n-$OC_{13}H_{27}$ | 8.1 g/100 g |
| -n-$OC_{15}H_{31}$ | 8.7 g/100 g |
| -n-$OC_{18}H_{37}$ | 1.1 g/100 g |
| Oxo oil 911 | |
| OH number | 186 mg KOH/g |
| Acid number | 4.3 mg KOH/g |
| Carbonyl number | 2 mg KOH/g |
| Ester number | 35 mg KOH/g |
| Zeisel alkoxy distribution: | |
| -$OC_3H_7$ | 1.1 g/100 g |
| -$OC_{12}H_{25}$ | 0.7 g/100 g |
| -n-$OC_{13}H_{27}$ | 7.7 g/100 g |
| -n-$OC_{15}H_{31}$ | 7.7 g/100 g |
| -n-$OC_{18}H_{37}$ | 1.0 g/100 g |

Determination of the values by the following methods:

Acid number: Method of analysis according to DAB 7 V.3.4.1

Ester number: Method of analysis according to DGF C-V3

OH number: was determined on the basis of the standard DIN-53240 of December 1971 or DIN-53240 Part II of December 1993

Carbonyl number: was determined on the basis of FCC-111 (Food Chemical Index)

Alkoxy number: Determination according to Zeisel, procedure according to SOP No. FG 006

EXAMPLE 2

Preparation of the PVC liquid stabilizers

PVC of the types Vinoflex® S 7114 (BASF) and plasticizers (BASF) were thoroughly mixed in a mixer, and PVC liquid stabilizers according to the following Examples were added. Depending on the use and formulation, additives such as pigments, chalk, various lubricants, etc. may be added. The mixture for calendered products (or spreading and extrusion) was plasticated at 180° C. on a Collin roll.

| | Parts by weight | | |
|---|---|---|---|
| Vinoflex S 7114 (or S 6514) | 70 | 80 | 80 |
| Plasticizer DOP | 30 | 20 | 20 |
| Ca/Zn liquid stabilizer | 1.1 | 1.1*) | 2.5*) |
| | (Example 3) | (Example 4) | (Example 5) |
| Heat stability (min/180° C.) | 60 | 75 | 110 |
| Color (5 min/180° C.) | 10.0 | 5.0 | 5.0 |
| Color (30 min/180° C.) | 14.5 | 9.5 | 9.0 |

*): White-pigmented semi-rigid film additionally contains 10 parts by weight of TiO₂ Cl 220, 5 parts by weight of Omyalit 95 T, 1 part by weight of K 120 N and 2 parts by weight if epoxidized soybean oil The heat stability was measured for a 2 mm thick molded sheet in an LUT 6050 Heraeus oven. The color of the molding sheet (yellowness index) was measured using a Minolta Chromameter CR 200 apparatus.

EXAMPLE 3

A stabilizer composition (1000 kg) was prepared by mixing the following components:

| Name of substance | % by wt. |
|---|---|
| Essovarsol 155/185[1] | 1.1 |
| Tripropylene glycol | 0.8 |
| Intermediate I-29[2] | 6.9 |
| Oxo oil 911 | 30.0 |
| Intermediate I-63[3] | 6.4 |
| Diphenyl isodecyl phosphite | 16.9 |
| Dibenzoylmethane | 2.2 |
| Antioxidant Irganox 1076[4] | 2.7 |
| Barium octadecanoate | 10.7 |
| Zinc octadecanoate | 3.1 |
| Barium p-tert-butylbenzoate | 14.8 |
| Zinc p-tert-butylbenzoate | 4.4 |

[1]Product from Exxon Chemicals, solvent
[2]Barium additive, BASF AG
[3]Hydrolyzed phosphite, BASF AG
[4]Product from Ciba-Geigy AG A PVC was compounded with this stabilizer composition as stated above.

EXAMPLE 4

A stabilizer composition (1000 kg) was prepared by mixing the following components:

| Name of substance | % by wt. |
|---|---|
| Tallow fatty acid | 17 |
| Versatic-10 acid[1] | 6 |
| Tripropylene glycol | 2 |
| Zinc oxide | 2,5 |
| Barium hydroxide octahydrate | 5 |
| Barium additive I-29[2] | 11 |
| Diphenyl decyl phosphite | 44 |
| Dibenzoylmethane | 3,5 |
| Oxo oil 911 | 10 |
| Antioxidant Irganox 1076[3] | 4 |
| Optical brightener[4] | 0,1 |

[1]Product from Shell-Chemie
[2]Product from BASF AG
[3]Product from Ciba-Geigy AG
[4]Product from Ciba-Geigy AG, Hoechst AG

EXAMPLE 5

A stabilizer composition (1000 kg) was prepared by mixing the following components:

| Name of substance | % by wt. |
|---|---|
| Tallow fatty acid | 30 |
| 2-Ethylhexanoic acid | 10 |
| p-tert-Butylbenzoic acid | 10 |
| Zinc oxide | 3.4 |
| Barium hydroxide octahydrate | 25 |
| Barium additive I-29[4] | 7 |
| Phosphite PNPG[1] | 11 |
| Dibenzoylmethane | 3.5 |
| Palatinol 911[2] or Solvesso 100[3] | 10 |

[1]Product from Weston
[2]Product from BASF AG
[3]Product from Exxon Chemicals
[4]Product from BASF L & F AG

We claim:

1. An additive for plastics, which comprises
   a. 5–70 parts by weight of oxo oil containing 5–15 weight % of ether alcohols
   b. 1–30 parts by weight of alkali metal or alkaline earth metal or zinc salts of organic acids of 8 to 18 carbon atoms
   c. 0.5–5 parts by weight of antioxidants
   d. 5–30 parts by weight of plasticizer
   e. 5 to 50 parts by weight of organic phosphite.

2. A composition as claimed in claim 1, wherein the component b contains a zinc salt of the acid or component b contains salts of one or more of the following acids:
   saturated and unsaturated fatty acids
   benzoic acid
   substituted benzoic acid, in particular p-tert-butylbenzoic acid.

3. The additive of claim 1, wherein the oxo oil comprises a mixture of low boilers and high boilers.

4. The additive of claim 1, wherein the oxo oil comprises alcohols, esters or diols having molecular weights of 220 to 500 and each group containing two oxygen groups are separated by 2 or 3 carbon atoms.

5. The additive of claim 1, wherein the oxo oil comprises the residue of the preparation of oxo alcohols having more than 8 carbon atoms.

6. The additive of claim 1 wherein the oxo oil consists essentially of carbon, oxygen, and hydrogen.

7. The additive of claim 1, wherein the oxo oil has a density (20° C.) of 0.82–0.94 g/cm$^3$, a viscosity (20° C.) of 20–500 mPa.s, a pour point of less than −10° C., and a boiling range of 230°–360° C.

8. The additive of claim 1, wherein the oxo oil comprises a residue from a reaction product of an oxo synthesis reaction.

9. The additive of claim 8, wherein the oxo synthesis reaction is the hydroformylation or oxo reaction of $C_3$–$C_{18}$-alkenes.

10. The additive of claim 8, wherein the oxo synthesis reaction is the hydroformylation or oxo reaction of $C_6$–$C_{18}$-alkenes.

11. A plastics material comprising plastic and additives, wherein said additive comprises 0.5–5 parts by weight, based on 100 parts by weight of plastics material, of oxo oil containing 5–15 weight % of ether alcohols.

12. A plastics material as claimed in claim 11 wherein said additive further comprises:
   alkali metal or alkaline earth metal salts of organic acids of 8 to 18 carbon atoms;
   antioxidants;
   plasticizer; and
   organic phosphite.

13. A method for stabilizing plastics comprising the step of adding an oxo oil having 5–15 weight % of ether alcohols to said plastic during processing.

14. The method of claim 13 wherein the oxo oils comprise a fraction of a liquid stabilizer composition.

15. The method of claim 13, wherein the oxo oil is added in an amount of 5–70% by weight of the total mass of the plastic, oxo-oil and other additives.

16. The method of claim 13, wherein the oxo oil comprises a mixture of low boilers and high boilers.

17. The method of claim 13, wherein the oxo oil comprises alcohols, esters, or diols having molecular weights of 220 to 500 and each group containing two oxygen groups are separated by 2 or 3 carbon atoms.

18. The method of claim 13, wherein the oxo oil comprises the residue of the preparation of oxo alcohols having more than 8 carbon atoms.

19. The method of claim 13 wherein the oxo alcohol consists essentially of carbon, oxygen, and hydrogen.

20. The method of claim 13, wherein the oxo oil has a density (20° C.) of 0.82–0.94 g/cm$^3$, a viscosity (20° C.) of 20–500 mPa.s, a pour point of less than −10° C., and a boiling range of 230°–360° C.

21. The method of claim 13, wherein the oxo oil is added to a halogen containing plastic.

22. The method of claim 21, wherein the halogen-containing plastic is a chloride-containing plastic.

23. The method of claim 13, wherein the oxo oil comprises a residue from a reaction product of an oxo synthesis reaction.

24. The method of claim 23, wherein the oxo synthesis reaction is the hydroformylation or oxo reaction of $C_3$–$C_{18}$-alkenes.

25. The method of claim 23, wherein the oxo synthesis reaction is the hydroformylation or oxo reaction of $C_6$–$C_{18}$-alkenes.

26. A method for stabilizing plastics comprising the following steps:
   a) diluting a concentrated stabilizing composition by adding oxo oil to form a mixture; and
   b) adding said mixture to the plastic.

* * * * *